(12) United States Patent
Walker et al.

(10) Patent No.: US 12,289,485 B2
(45) Date of Patent: Apr. 29, 2025

(54) SYSTEMS AND METHODS FOR CONTROLLING CONTENT STREAMS

(71) Applicant: Sony Interactive Entertainment Europe Limited, London (GB)

(72) Inventors: Andrew William Walker, London (GB); Richard Thomas Downey, London (GB); Martin Selby George, London (GB); Alan Suganuma Murphy, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 0 days.

(21) Appl. No.: 18/208,107

(22) Filed: Jun. 9, 2023

(65) Prior Publication Data

US 2023/0403419 A1 Dec. 14, 2023

(30) Foreign Application Priority Data

Jun. 10, 2022 (GB) .................................... 2208500

(51) Int. Cl.
*H04N 21/24* (2011.01)
*H04N 21/233* (2011.01)
*H04N 21/234* (2011.01)

(52) U.S. Cl.
CPC ....... *H04N 21/2402* (2013.01); *H04N 21/233* (2013.01); *H04N 21/23418* (2013.01); *H04N 21/2407* (2013.01)

(58) Field of Classification Search
CPC ............. H04N 21/2402; H04N 21/233; H04N 21/23418; H04N 21/2407;
(Continued)

(56) References Cited

U.S. PATENT DOCUMENTS 9,549,001 B1 * 1/2017 Qureshey ................ G06F 3/167
10,021,434 B2 * 7/2018 Rynderman ... H04N 21/234327
(Continued)

FOREIGN PATENT DOCUMENTS

EP 3 657 814 A1 5/2020

OTHER PUBLICATIONS

UK IPO Combined Search and Examination Report received in Application No. GB2208500.5, date of search Nov. 10, 2022, in 7 pages.
(Continued)

*Primary Examiner* — Michael Won
(74) *Attorney, Agent, or Firm* — Procopio, Cory, Hargreaves & Savitch LLP

(57) ABSTRACT

There is provided a method of sending a content stream, comprising retrieving a sender framework associated with the at least one attribute, wherein the sender framework defines an arrangement of the plurality of tracks to be included in an output content stream. The output content stream is defined according to the sender framework. There is also provided a method of outputting a content stream on a user device, comprising receiving a content stream as defined by a sender framework, retrieving a user framework associated with the user electronic device, wherein the user framework defines at least one predetermined setting or instruction to be applied to the content stream, and applying the user framework to the content stream to update the content stream. The method may also include providing viewer engagement information and updating the sender framework in response to the viewer engagement information received.

16 Claims, 7 Drawing Sheets

(58) Field of Classification Search
CPC ......... H04N 21/23412; H04N 21/2343; H04N 21/25833; H04N 21/26208; H04N 21/26616; H04N 21/4438; H04N 21/472; H04N 21/2665; H04N 21/236; H04N 21/25; H04L 65/762; H04L 65/611; H04L 65/765

See application file for complete search history.

(56) References Cited

U.S. PATENT DOCUMENTS

| | | | |
|---|---|---|---|
| 1,336,707 A1 | 5/2022 | Pipher et al. | |
| 11,689,601 B1* | 6/2023 | Fox | H04N 21/234354 709/231 |
| 2002/0042923 A1* | 4/2002 | Asmussen | H04N 21/6543 348/E5.103 |
| 2007/0024706 A1 | 2/2007 | Brannon, Jr. et al. | |
| 2007/0250901 A1* | 10/2007 | McIntire | H04N 21/47815 348/E7.071 |
| 2008/0126109 A1 | 5/2008 | Cragun et al. | |
| 2009/0089162 A1* | 4/2009 | Davis | G06Q 30/0241 705/14.73 |
| 2009/0172170 A1* | 7/2009 | Rey | H04L 65/765 709/227 |
| 2009/0182891 A1 | 7/2009 | Jalili et al. | |
| 2009/0303311 A1 | 12/2009 | Stoen et al. | |
| 2012/0144053 A1 | 6/2012 | Futty et al. | |
| 2014/0074846 A1* | 3/2014 | Moss | H04L 65/60 707/740 |
| 2014/0297883 A1 | 10/2014 | Srinivasan et al. | |
| 2015/0066587 A1* | 3/2015 | Glommen | G06F 40/197 705/7.29 |
| 2015/0071427 A1* | 3/2015 | Kelley | H04M 3/4878 379/265.09 |
| 2015/0229978 A1* | 8/2015 | Brown | H04N 21/25891 725/34 |
| 2016/0381109 A1* | 12/2016 | Barnett | H04N 21/4622 709/231 |
| 2017/0289635 A1* | 10/2017 | Shaw | H04N 21/25891 |
| 2018/0255336 A1 | 9/2018 | Tallamy et al. | |
| 2018/0316942 A1 | 11/2018 | Todd | |
| 2018/0367823 A1* | 12/2018 | Brinkley | H04N 21/8456 |
| 2020/0068026 A1* | 2/2020 | Morkovine | H04L 65/4015 |
| 2021/0044674 A1* | 2/2021 | Govan | H04L 67/53 |
| 2021/0112010 A1* | 4/2021 | May | H04N 21/454 |
| 2022/0230195 A1* | 7/2022 | Rohlfs | H04L 9/3239 |
| 2022/0345754 A1* | 10/2022 | Pollock | H04N 21/44222 |
| 2023/0051431 A1* | 2/2023 | Zhu | H04N 19/167 |
| 2023/0403419 A1* | 12/2023 | Walker | H04N 21/2665 |
| 2024/0193913 A1* | 6/2024 | Saraee | G06N 3/045 |

OTHER PUBLICATIONS

UK IPO Search Report received in Application No. GB2208500.5, date of search May 23, 2023, in 5 pages.

Extended European Search Report received in Application No. EP 23178407.5, dated Jul. 27, 2023, in 8 pages.

* cited by examiner

SYSTEMS AND METHODS FOR CONTROLLING CONTENT STREAMS

CROSS-REFERENCE TO RELATED APPLICATIONS

This application claims the benefit of Application No. GB 2208500.5, filed on Jun. 10, 2022, the contents of which are incorporated herein by reference.

BACKGROUND

The present specification relates to the sending, receipt and outputting of content streams comprising a plurality of tracks. The plurality of tracks may include at least one audio track, at least one video track and at least one data track.

The streaming of content, for example on a TV, games console, computer, of mobile phone, for both educational, work and entertainment purposes is now a part of everyday life for most people. For example, a content stream may be a live sport or music event broadcast, a video game, a conference, or a video from a popular online streamer.

A content stream (or broadcast presentation) comprises content from a plurality of sources. Each source can provide one or more of audio, video, data, metadata or other content. Thus, a significant amount of information can be contained in a single content stream output to a viewer. In practice, it can be overwhelming or difficult for the viewer to find the content that is of the most interest to them within.

It is an object of the present disclosure to improve the sending, output and updating of such content streams.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a method of sending a content stream from a sender to at least one user electronic device, the method comprising obtaining, at the sender, an input content stream comprising a plurality of tracks, determining at least one attribute of the input content stream, retrieving a framework associated with the at least one attribute, wherein the framework defines an arrangement of the plurality of tracks to be included in an output content stream, preparing the output content stream as defined in the framework, and sending the output content stream to a user electronic device via a wireless communication channel.

Optionally, the sender may be referred to as a broadcaster.

Optionally, the plurality of tracks comprises at least one video track, and/or at least one audio track, and/or at least one data track.

Optionally, the at least one data track comprises one or more of: game play information; user interface information; at least one GUI element; player information; environmental information; and/or metadata.

Optionally, the at least one attribute comprises one or more of: stream type; content type; content genre; and/or a number of tracks contained in the plurality of tracks.

Stream type may include an identifier or indication as to whether the input content stream relates to a TV broadcast, a radio broadcast, a computer game, an e-sports event, etc.

Content type may include an identifier or indication as to the type of tracks included in the plurality of tracks, where in the types of track may include audio tracks, video or image tracks, and/or data tracks.

In some embodiments, content genre may comprise a definition or classification of a genre of the content (or stream). Examples of content genres include gaming genres (including but not limited to as football games, first person shooter games, VR games, etc.), video or TV genres (including but not limited to motor-racing broadcasts, sporting events, music concerts, e-sports tournaments, etc.), and/or audio genres (such as jazz music or classical music, etc.).

Optionally, determining at least one attribute of the input content stream comprises detecting an event in at least one of the plurality of tracks.

Optionally, preparing the output content stream as defined in the framework comprises selecting a subset of the plurality of tracks for inclusion in the output content stream. Thus, in some embodiments, not all tracks received by the sender may be output to the at least one user electronic device.

Optionally, preparing the output content stream as defined in the framework comprises processing or filtering the plurality of tracks.

Optionally, preparing the output content stream as defined in the framework comprises defining a relative weighting of each of the plurality of tracks to be included in the content stream.

Optionally, preparing the output content stream as defined in the framework comprises adjusting at least one property of one or more of the plurality of tracks to be included in the content stream.

Optionally, preparing the content stream as defined in the framework comprises providing display instructions defining how the plurality of tracks to be included in the content stream should be displayed on the user electronic device.

Optionally, the method comprises determining at least one attribute of one or more of the plurality of tracks, and updating the framework or the output content stream accordingly.

Optionally, determining the at least one attribute of one or more of the plurality of tracks comprises determining a property of the one or more tracks indicative of quality or technical performance. Optionally, the method comprises comparing the property to a predetermined threshold.

In response to determining that the property is below the predetermined threshold, the method may comprise removing the track from the output content stream.

In some embodiments, the method may include determining audio or visual quality of at least one track and comparing to a minimum audio or visual quality threshold. If a track is below the minimum audio or visual quality threshold the track may be removed from the output content stream, or not sent to the user electronic device.

In some embodiments, determining a property of the one or more tracks indicative of quality or technical performance may comprise determining if the one or more tracks include at least one audio track and/or at least one video track.

Optionally, the method further comprises determining at least one property of the user electronic device. Optionally, the method further comprises determining at least one property of the wireless communication channel. The method may comprise updating the framework or the output content stream accordingly.

Optionally, determining at least one property of the user electronic device comprises determining a type of the user electronic device. In some embodiments the type of user electronic device may be selected from: a PC; a laptop; a tablet computer; a mobile phone; a smart TV; a gaming console; or other computing device. It will be appreciated that a number of properties vary depending on the type of electronic device, including processing power, display screen space and audio set-up, thus determining the type of user electronic device can allow the framework to be adjusted accordingly.

Optionally, determining at least one property of the user electronic device and/or of the wireless communication channel comprises determining one or more of: an estimated bandwidth of the wireless communication channel; a measure of quality or speed of the wireless communication channel; an estimated maximum processing power of the user electronic device; and/or an estimated maximum number of video feeds or images that can be simultaneously displayed on the user electronic device.

Optionally, the method may include executing a network test to determine at least one property of the wireless communication channel. The at least one property may include download speed, upload speed, ping (or network latency) and/or bandwidth.

Optionally, updating the framework or the output content stream comprises adjusting a composition of the output content stream. This may comprise increasing the number of a given type of track (e.g., audio tracks) or decreasing the number of a given type of track (e.g., video tracks) but keeping the overall number of tracks in the output content stream the same.

Optionally, updating the framework or the output content stream comprises adjusting an overall number of the plurality of tracks included in the output content stream. Adjusting may comprise increasing or decreasing the overall number of tracks included in the output content stream.

Optionally, updating the framework or the output content stream comprises adjusting a resolution of one or more of the plurality of tracks included in the content stream, and/or compressing one or more of the plurality of tracks included in the output content stream.

Optionally, the method comprises monitoring the plurality of tracks received at the sender. In response to detecting that a given track is no longer being received at the sender, the method may comprise updating the framework.

Optionally, in response to detecting that a predetermined number of the plurality of tracks are no longer being received at the sender, the method may comprise retrieving a second framework and arranging the output content stream as defined in the second framework.

Optionally, in response to detecting that a predetermined condition has been satisfied, the method may comprise retrieving a second framework and arranging the output content stream as defined in the second framework. For example, the predetermined condition may be the termination of one or more tracks in the input content stream, or the elapse of a predetermined amount of time, etc.

Optionally, the second framework is a default framework, or a menu framework.

In a second aspect, the present disclosure provides a method of outputting a content stream on a user electronic device, the user electronic device comprising a display screen. The method comprises receiving a content stream comprising a plurality of tracks from a sender via a wireless communication channel, retrieving a user framework associated with the user electronic device, wherein the user framework defines at least one predetermined setting or instruction to be applied to the content stream, applying the user framework to the content stream to update the content stream, and outputting the updated content stream on the user electronic device.

The content stream received by the user electronic device may be arranged in accordance with a sender framework. The user framework may take priority over the sender framework, if the two are in conflict.

Optionally, outputting the updated content stream comprises displaying at least one of the plurality of tracks on the display screen of the user electronic device.

Optionally, outputting the updated content stream comprises rendering at least a portion of one of the tracks for display on the display screen of the user electronic device.

Optionally, the plurality of tracks comprises at least one video track, and/or at least one audio track, and/or at least one data track.

Optionally, the at least one data track comprises one or more of: game play information; user interface information; at least one GUI element; player information; environmental information; and/or metadata.

It will be appreciated that the content stream as received by the user electronic device may correspond to any embodiment or example of the output content stream defined by the first aspect of the disclosure.

Optionally, the at least one predetermined setting or instruction defined by the user framework includes a maximum number of video feeds that can be simultaneously displayed on the user electronic device.

Optionally, the at least one predetermined setting or instruction defined by the user framework includes a spatial location of one or more of the plurality of tracks to be output on the user electronic device.

Optionally, the at least one predetermined setting or instruction defined by the user framework includes a visual parameter of one or more of the plurality of tracks to be output on the user electronic device, and/or an audio parameter of one or more of the plurality of tracks to be output on the user electronic device.

Optionally, the user framework defines a subset of the plurality of tracks to be output on the user electronic device. In some embodiments, not all of the tracks received by the user electronic device may be output.

Optionally, the method comprises monitoring the bandwidth or quality of the wireless communication channel.

Optionally, the method comprises adjusting the user framework in response to detecting a change in the bandwidth or quality of the wireless communication channel.

Optionally, adjusting the user framework comprises adjusting a composition of the content stream to be output on the user electronic device.

Optionally, adjusting the user framework comprises adjusting an overall number of the plurality of tracks included in the content stream to be output by the user electronic device.

Optionally, adjusting the user framework comprises adjusting a resolution of one or more of the plurality of tracks included in the content stream.

Optionally, adjusting the user framework comprises compressing one or more of the plurality of tracks included in the content stream.

Optionally, the method comprises receiving a user input to adjust the user framework, and adjusting the user framework in response to the user input received. In some embodiments, the user input may be input on the user electronic device, or the user input may be input on an input device in communication with the user electronic device.

Optionally, following adjusting the user framework, the method may further comprise applying the adjusted user framework to the content stream to update the content stream, and outputting the updated content stream on the user electronic device.

Optionally, applying the user framework to the content stream further comprises retrieving information stored on the user electronic device. The method may comprise including the retrieved information in the content stream.

In a third aspect, the present disclosure provides a method of updating a framework for a content stream, the content stream comprising a plurality of tracks. The method comprises providing a content stream as defined by a framework, wherein the framework defines at least one setting or property of the content stream, sending the content stream as defined by the framework from a sender to a plurality of user electronic devices, providing viewer engagement information from at least one of the plurality of user electronic devices to the sender, wherein said viewer engagement information comprises data defining how the content stream is being output at the given user device, and updating the framework in response to the viewer engagement information received.

The framework may be referred to as a sender framework. The sender framework may be as defined in any embodiment or example of the first aspect of the disclosure.

Optionally, the viewer engagement information comprises an identification of the tracks or data being output on the user device.

Optionally, the viewer engagement information comprises an indication of any user changes made to the framework. Optionally, the viewer engagement information comprises an indication of any changes made to the content stream in accordance with a user framework. The user framework may be as defined in any embodiment or example of the second aspect of the disclosure.

Optionally, the viewer engagement information comprises a visual or audio parameter adjusted or defined by the user. Optionally, an audio parameter may be a volume of one or more of the audio tracks. Optionally, a visual parameter may be a brightness, display size or location, or resolution, etc. of one or more of the image or video tracks.

Optionally, the method may include aggregating or collating the viewer engagement information received from the plurality of user electronic devices.

Optionally, the method may include analysing or processing the aggregated viewer engagement information. Analysing the aggregated viewer engagement information may comprise determining a correlation between the viewer engagement information received from the plurality of user electronic devices.

Optionally, the method may include updating the framework in response to determining that a predetermined number of user electronic devices have provided the same viewer engagement information.

Optionally, the method may include determining if the viewer engagement information is indicative of a possible technical issue with a given track in the content stream. For example, if multiple viewers all mute or remove the same audio or video track this may be an indication of a technical error with the track.

Optionally, the method may comprise outputting a notification in response to determining that the viewer engagement information is indicative of a possible technical issue. The notification may be output by the sender. The notification may be output to the source of the content track, and/or the notification may be output to the user electronic devices.

In a fourth aspect, the present disclosure provides a sender electronic device comprising a processor and memory including executable instructions that, as a result of execution by the processor, causes the sender electronic device to perform the computer-implemented method of any embodiment or example of the first aspect of the disclosure.

In a fifth aspect, the present disclosure provides a user electronic device, comprising a display screen, a processor, and memory including executable instructions that, as a result of execution by the processor, causes the user electronic device to perform the computer-implemented method of any embodiment or example of the second aspect of the disclosure.

It will be appreciated that the term computing device may be used interchangeably with electronic device in this disclosure.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1A:
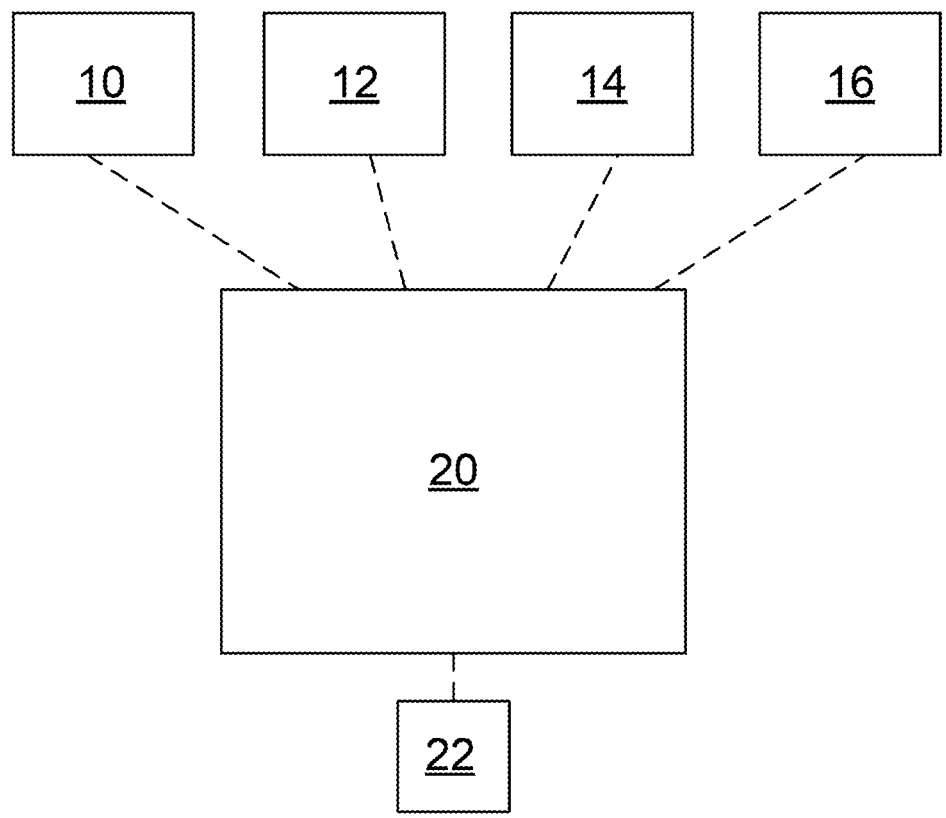
FIG. 1A is a block diagram illustrating a system according to an embodiment of this disclosure.

FIG. 1A is a simplified representation of a communication system according to an embodiment of this disclosure. A sender 20 is configured to communicate with a plurality of user electronic devices 10, 12, 14, 16 via wireless communication channels (represented by the dotted lines). It will be appreciated that although FIG. 1A shows four user electronic devices 10, 12, 14, 16, any number of user electronic devices may be in communication with the sender 20. The sender 20 is also an electronic device. The sender 20 may be referred to as a broadcaster. It will be appreciated that the term computing device may be used interchangeably with electronic device in the present disclosure.

Each of the user electronic devices 10, 12, 14, 16 and the sender 20 may be any type of computing device, including but not limited to, a PC, laptop, tablet computer, mobile phone, television or smart TV, smart watch, and/or gaming console. It will be appreciated that the sender 20 and each user electronic device 10, 12, 14, 16 may comprise a plurality of electronic devices operably in communication with each other.

The wireless communication channels between the sender 20 and the user electronic devices 10, 12, 14, 16 may be any type of wireless communication channel. For example, the sender 20 may communicate with the user electronic devices 10, 12, 14, 16 via Wi-Fi® or other wireless internet connection, NFC, Bluetooth®, etc.

A source 22 is also in operable communication with the sender 20. The source 22 is configured to provide an input content stream to the sender 20, wherein the input content stream comprises a plurality of tracks. In some embodiments, the source 22 may be the sender 20. In some embodiments, at least one of the tracks may be provided by the sender 20.

Figure 2:
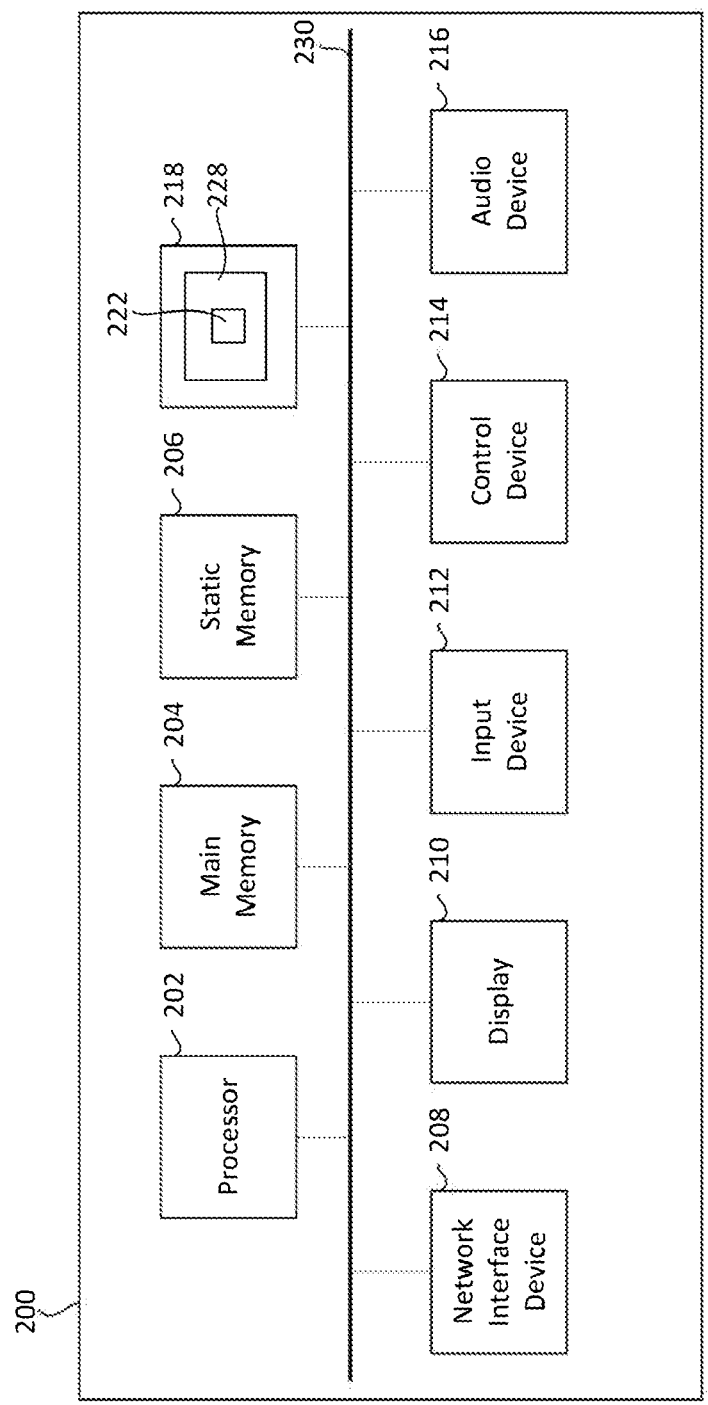
FIG. 2 is a block diagram illustrating a user electronic device or a sender electronic device according to an embodiment of this disclosure.

FIG. 2 illustrates a block diagram of one example implementation of a computing device 200 that may form part of the user electronic device 10, 12, 14, 16, or the sender 20. The computing device 200 is associated with executable instructions for causing the computing device 200 to perform any one or more of the methodologies discussed herein. The computing device 200 may operate in the capacity of the data model or one or more computing resources for implementing the data model for carrying out the methods of the present disclosure. In alternative implementations, the computing device 200 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 200 includes a processing device 202, a main memory 204 (e.g., read-only memory (ROM), flash memory, dynamic random-access memory (DRAM) such as synchronous DRAM (SDRAM) or Rambus DRAM (RDRAM), etc.), a static memory 206 (e.g., flash memory, static random-access memory (SRAM), etc.), and a secondary memory (e.g., a data storage device 218), which communicate with each other via a bus 230.

Processing device 202 represents one or more general-purpose processors such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 202 may also be one or more special-purpose processing devices such as an application specific integrated circuit (ASIC), a field programmable gate array (FPGA), a digital signal processor (DSP), network processor, or the like. Processing device 202 is configured to execute the processing logic (instructions 222) for performing the operations and steps discussed herein.

The computing device 200 may further include a network interface device 208. The computing device 200 also may include a video display unit 210 (e.g., a liquid crystal display (LCD) or a cathode ray tube (CRT)), an alphanumeric input device 212 (e.g., a keyboard or touchscreen), a cursor control device 214 (e.g., a mouse or touchscreen), and an audio device 216 (e.g., a speaker).

The data storage device 218 may include one or more machine-readable storage media (or more specifically one or more non-transitory computer-readable storage media) 228 on which is stored one or more sets of instructions 222 embodying any one or more of the methodologies or functions described herein. The instructions 222 may also reside, completely or at least partially, within the main memory 204 and/or within the processing device 202 during execution thereof by the computer system 200, the main memory 204 and the processing device 202 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1B:
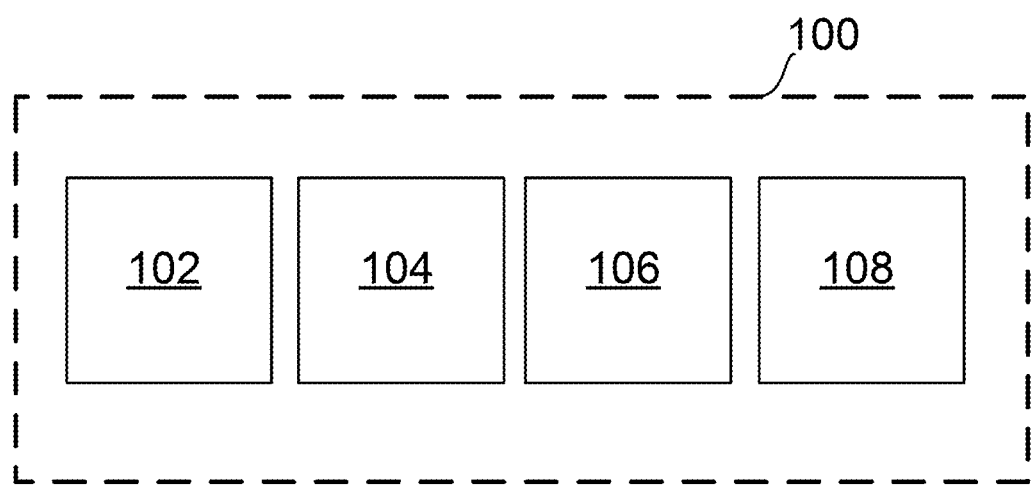
FIG. 1B is a block diagram representing an input or output content stream according to an embodiment of this disclosure.

A simplified representation of an input content stream 100 is shown in FIG. 1B. The input content stream 100 is received by the sender 20 and processed before outputting to the user electronic devices 10, 12, 14, 16. The input content stream 100 comprises a plurality of tracks 102, 104, 106, 108. It will be appreciated that although FIG. 1B shows four tracks, the plurality of tracks (or the input content stream 100) may comprise any number of tracks.

In some embodiments, each track 102, 104, 106, 108 may be a video track, or an image track, or an audio track, or a data track. In other embodiments, different types of track may be provided. It will be appreciated that more than one type of track may be provided. In some embodiments, the plurality of tracks can include two or more audio tracks, or two or more video tracks, or two or more data tracks. In some embodiments, no tracks of a given type may be provided. In other words, the plurality of tracks may include no video tracks, or no audio tracks, or no data tracks, etc.

In some embodiments, a data track may comprise game play information, user interface information, at least one GUI element, player information, environmental information such as the weather, and/or metadata.

Figure 3:
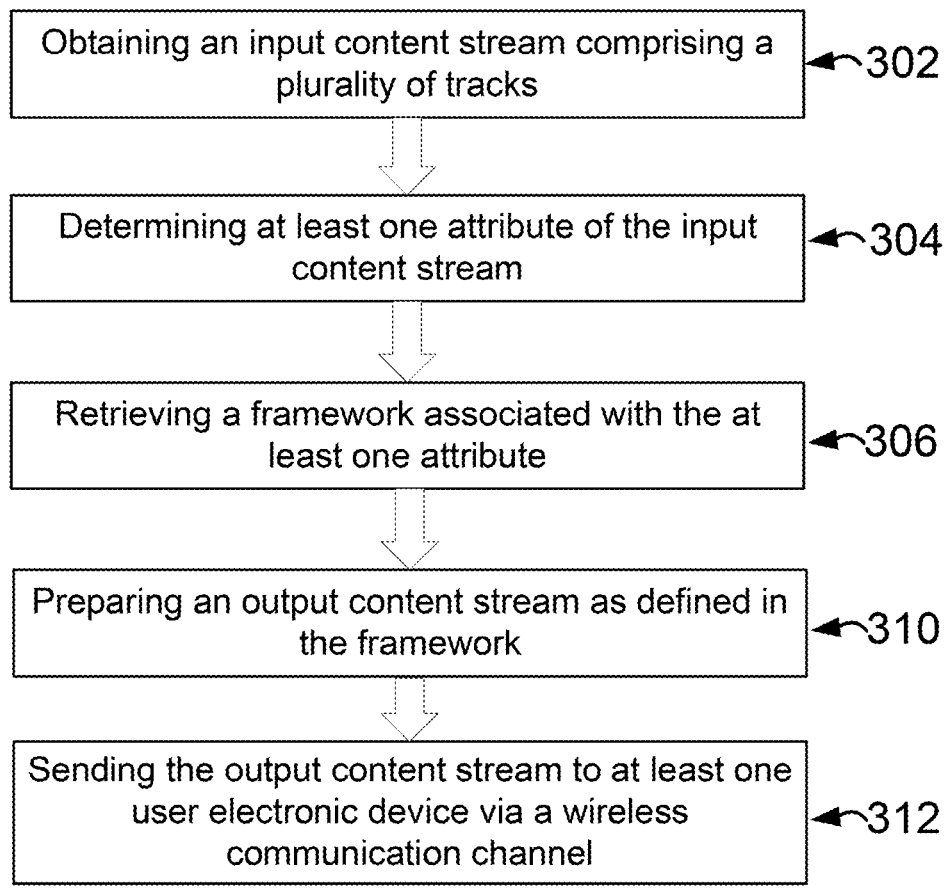
FIG. 3 is a flowchart illustrating a method of sending a content stream according to an embodiment of this disclosure.

A method of sending a content stream to a user electronic device according to an embodiment of this disclosure is illustrated in the flowchart in FIG. 3. As such, the method in FIG. 3 is from the perspective of the sender 20.

At step 302 the method includes obtaining, at the sender, an input content stream comprising a plurality of tracks. As mentioned above, in some embodiments the sender may retrieve data or content for inclusion in the input content stream from memory, or a storage means or a computing device in communication with the sender. In some embodiments, the sender may obtain the plurality of tracks from multiple sources.

At step 304 the method comprises determining at least one attribute of the input content stream. In some embodiments, the at least one attribute comprises one or more of stream type, content type, or content genre.

In some embodiments, the at least one attribute may include a number of tracks contained in the plurality of tracks, or the number of a given type of track in the plurality of tracks, for example the number of different video or audio tracks.

In some embodiments, if there are more than a threshold number of a given type of track the framework may enable a more detailed mixer to allow the user to control the large amount of data, such as audiovisual data and/or metadata, being presented. It will be appreciated that this feature could form part of the sender framework and/or the user framework (e.g., see below discussion of FIGS. 5 and 6 regarding the user framework).

If the user framework is configured to control the mixer, this may allow the user to enable tracks without any delay. However, it would be possible for the user to receive data tracks which are never rendered, which could be considered a waste of network bandwidth.

If the broadcast framework is configured to control the mixer, then the user may be able to switch off tracks they are not interested in so the sender thus only sends tracks that will be rendered (preserving network bandwidth and freeing up other resources for the sender). However, there may be some delay between a user requesting an additional track (not already being rendered) and receiving it from the sender.

In a particular example, determining at least one attribute may comprise reviewing the input content stream and determining that the input content stream is (or includes) a video game. The genre of the video game may also be determined. The genre of video game may include, but is not limited to, a first person shooter (FPS), a platform game, a card game or boardgame, a real time strategy (RTS) game, a role playing game (RPG), a Massively Multiplayer Online Role-Playing Game (MMORPG), a simulation game, or a sandbox game, etc.

In some embodiments, determining at least one attribute may comprise determining a game mode, including but not limited to, single player, multiplayer (optionally more specifically co-op or free-for-all), online mode, offline mode, etc.

In some embodiments, the at least one attribute may include the number of players in the input content stream, or other properties related to the type of video game or the content stream. The present disclosure is not limited to video or computer games.

It will be appreciated that the input content stream can comprise identifiers, or information, that allows the at least one attribute to be determined by the sender. For example, a game type can be expressed in metadata embedded with the game, or alternatively the title of the game may be provided in the input content stream and the sender may determine the game type (or other attribute) by retrieving information from a resource such as an online store.

In some embodiments, determining at least one attribute of the input content stream comprises detecting an event in at least one of the plurality of tracks. An event may be any feature or occurrence in the content stream which may be of interest to the viewer. In some non-limiting examples, an event could be a goal scored in a football match; half time reached in a match; next race starting; lap completed when watching a motor race and following a specific driver in the race; flags raised by race officials (e.g. the red flag) in motorsport.

An event may be detected by the presence of predetermined properties of the input content stream, or other features indicative of an event of interest. In some non-limiting examples an event may be identified by detecting: timed metadata present in the content stream (i.e. the broadcast) in-band; audio cues (e.g. commentators getting excited, change in voice tone, speed or volume could indicate an event that might be of interest to the user); visual cues such as scene detection, significant difference in video frames for a predefined period of time would indicate a scene change, e.g. end of an event. In-band metadata may be the preferred method for detecting an event as this is less ambiguous that relying on audio or visual cues etc.

In a particular example, determining at least one attribute may comprise reviewing the input content stream and determining that the input content stream is a sporting event broadcast. The type of sporting event may be determined.

The type of sporting event may include, but is not limited to, athletics, football (soccer), American football, motor racing, rugby, etc.

At step 306, the method comprises retrieving a framework associated with the at least one attribute determined in step 304. The framework may be referred to as a template, or a sender framework, or a broadcaster framework. The framework defines an arrangement of the plurality of tracks to be included in an output content stream (to be output by the sender). Preferably, the framework defines an arrangement of the input content stream that the sender believes to be the best arrangement of tracks for the content that they are broadcasting.

At step 310, the method comprises preparing an output content stream from the input content stream, as defined in the framework. In other words, step 310 comprises applying the framework to the input content stream to provide an output content stream.

Preparing the output content stream as defined in the framework may comprise selecting a subset of the plurality of tracks from the input content stream for inclusion in the output content stream. As such, in some embodiments not all of the tracks obtained by the sender may be output in the output content stream.

Preparing the output content stream as defined in the framework may comprise processing or filtering the plurality of tracks from the input content stream, and/or defining a relative weighting of each of the plurality of tracks to be included in the output content stream. In some embodiments, preparing the output content stream may comprise adjusting at least one property of one or more of the plurality of tracks to be included in the output content stream, as defined in the framework.

In some embodiments, preparing the output content stream may comprise providing display instructions defining how the plurality of tracks to be included in the output content stream should be displayed on the user electronic device.

In an example, if the input content stream is determined to be a motor-racing broadcast (e.g. an F1 race) the framework retrieved may dictate the layout on the user electronic device display screen for each camera feed of most interest. This may be to have the main feed from the broadcaster occupying the whole screen and then to have other camera feeds composited on top of this. There could be a small video shown in one corner of the screen with the feed from the lead driver's head-mounted camera. There would also be a requirement in the framework for leader-board statistics to be provided. The framework may specify, for example, that the race leader's time and name is displayed at the top of the screen along with the same information for drivers in second and third place and shown in order of their race position. The framework might specify that the main commentary is combined with the audio from the race itself (main camera feed). The framework may specify that a live map of the race is shown as an outline at the bottom of the screen along with car numbers on it, each car number representing the position of the respective driver in the race. This map could be rendered locally (on the user electronic device) as the output content stream could include the race data (consisting of driver GPS, times, names etc.) sent as a data track to be processed by the user electronic device. In some embodiments, a streamer can have an asset pack for example their logo or a particular map, which can be pre-loaded and contextual data signaled by manifest files, for example.

In some embodiments, a motor-racing framework could be used for any kind of motor-racing event stream, whether it is Formula One, Touring Cars or Supercross, for example. As long as the sender can provide to the user electronic device all of the information required by the framework, the user electronic device is then able to construct a view of the content stream which is consistent with all viewing experiences of motor-racing and familiar to the viewer. In some embodiments, if the sender cannot provide to the user electronic device all of the information required by the framework, then an alternative framework may be selected.

To give another example, in gaming, a framework for First Person Shooter type games may define a set of data fields required for inclusion in at least one data track. This data may include, but is not limited to, player health, ammunition, selected weapon, player position, team-mates' positions and a mini-map of the current level. Once the user electronic device has received all of this data, it is able to lay out a gaming experience following the framework, for example with the key statistics and the mini-map displayed at fixed positions on the screen, showing other players on the same team in the game. Similar to the racing experience, the user, in this case a game-player, has a familiar experience compared to when playing other First Person Shooter type games, which are also presented according to the same or similar framework.

At step 312, the output content stream is sent by the sender to at least one user electronic device 10, 12, 14, 16, via a wireless communication channel, as described in connection with FIG. 1A.

Traditionally, when a broadcast presentation (or content stream) is comprised of a plurality of different tracks of audio, video and data, optionally from a variety of different sources, this can create problems for the user. In particular, information or content of high importance and/or interest to the user may be difficult to find, or may be missing from the presentation altogether due to the fact that not all of the available streams (or tracks) may able to be shown simultaneously on the user electronic device.

In addition, while the arrangement of a content stream may be suitable for one type of stream (such as a sports TV broadcast), the same arrangement may be unsuitable for a different type or genre of content stream, as the type of content and how this is usually consumed by the user may be quite different.

By providing different frameworks associated with particular attributes of a content stream the sender can ensure that the output content stream is tailored to the content therein, and provides the content to the user in a useful and convenient manner. The framework should reduce the amount of time and effort that the user spends adjusting the content stream. In addition, as the framework can provide a consistent content stream composition for streams of a similar content type this can ensure a consistent experience for the user.

It will be appreciated that the framework is not limited to controlling the presentation of information, as the framework can mitigate or identify technical problems with the input content stream. Preferably, the framework can be adapted or adjusted in response to certain events or triggers.

Figure 4:
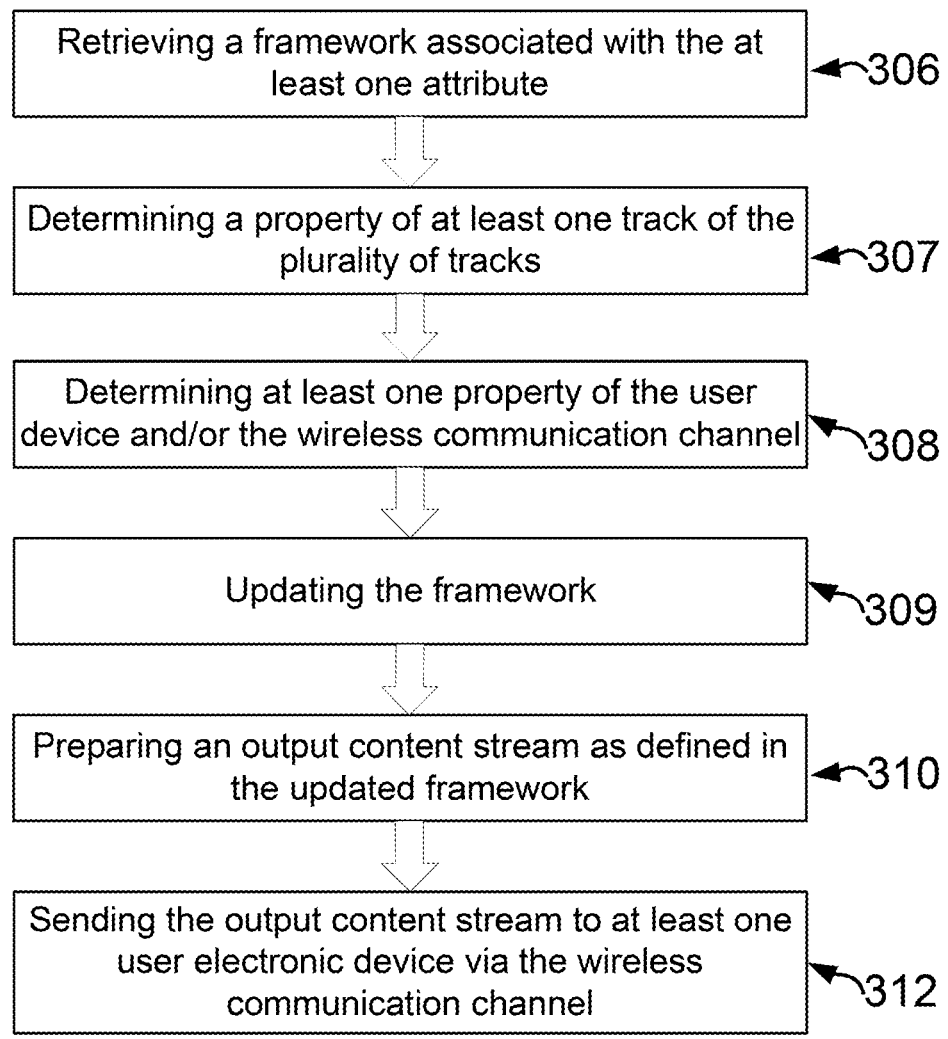
FIG. 4 is a flowchart illustrating a further method of sending a content stream according to an embodiment of this disclosure.

The flowchart in FIG. 4 shows another method of sending a content stream to at least one user electronic device, which follows on from step 306 in FIG. 3.

At step 307, the method comprises determining a property of at least one track of the plurality of tracks. This property may be indicative of quality or technical performance. For example, if the track is an audio track the method may comprise determining the signal to noise ratio (SNR) of the track, or the volume of the track, or any other property indicative of audio quality.

Step 307 may include comparing the determined property of the at least one track to a predetermined threshold. The predetermined threshold may be indicative of a minimum quality requirement. The predetermined threshold may be adjustable. In some embodiments, the predetermined threshold may be associated with the framework, as this may allow specific thresholds to be tailored to the content or stream type.

At step 308 the method comprises determining at least one property of the user electronic device and/or of the wireless communication channel between the user electronic device and the sender. The at least one property of the user electronic device may be an indication of the type of device (such as a PC, laptop, smart phone, or TV), or an estimated maximum processing power of the user electronic device. In some embodiments, the at least one property of the user electronic device may be an indication of the audio output capability of the device, or a display screen size, or an estimated maximum number of video feeds that can be simultaneously displayed on the user electronic device.

In some embodiments, the at least one property of the wireless communication channel may provide an indication of the speed and/or strength of the wireless communication channel. The at least one property of the wireless communication channel may be an estimated (or measured) bandwidth of the wireless communication channel. The at least one property of the wireless communication channel may be an estimated (or measured) ping value, or download speed, or upload speed of the wireless communication channel. Step 308 may comprise comparing the at least one property of the wireless communication channel to a predetermined threshold.

At step 309, the method may include updating the framework accordingly, in response to the determined property of the at least one track, user device and/or wireless communication channel.

In some embodiments, in response to determining that the property of the track is below the predetermined threshold, at step 309 the method comprises removing the track from the framework (and thus from the output content stream).

In some embodiments, step 309 comprises adjusting a composition of the output content stream, and/or adjusting an overall number of the plurality of tracks included in the output content stream. For example, in response to determining that the user device is a smart phone (or has a processing power below a given threshold), the framework may be adjusted to reduce the number of video tracks (such as to one video feed).

In some embodiments, step 309 comprises adjusting a resolution of one or more of the plurality of tracks included in the output content stream, and/or compressing one or more of the plurality of tracks included in the output content stream. For example, lower resolution images or videos may be included in the output content stream in response to determining that the wireless communication channel has a low bandwidth or download speed.

Additionally or alternatively, step 307 may comprise monitoring the status of the plurality of tracks received at the sender and detecting if one or more of the tracks is no longer received at the sender. In response to detecting that a given track is no longer being received at the sender, step 309 may comprise updating the framework to remove that track.

In response to detecting that a predetermined number of the plurality of tracks are no longer being received at the sender, step 309 may comprise updating the framework. In some embodiments updating the framework may comprise retrieving a default or menu framework.

Thus, the default or menu framework may be retrieved in response to detecting the termination (or loss) of the input content stream.

The method may comprise detecting when certain data types, or tracks, stop or start streaming. For example, in a stream of a racing game, position data (of each of the participants, 1st place 2nd place, etc.) may be contained in a data track transmitted during the race. When the position data suddenly stops being streamed, it can be detected that the race has finished and the game is now in 'menu mode', which could trigger a different framework to be applied (change from 'race mode' to menu mode).

At step 310 the output content stream is prepared as defined in the updated framework and then sent to the at least one user electronic device via the wireless communication channel (step 312).

It will be appreciated that the framework (and the output content stream) can be updated during transmission of the content stream to the user electronic device. As such, steps 307 and 308 may comprise monitoring the at least one properties during the output of the content stream.

Figure 5:
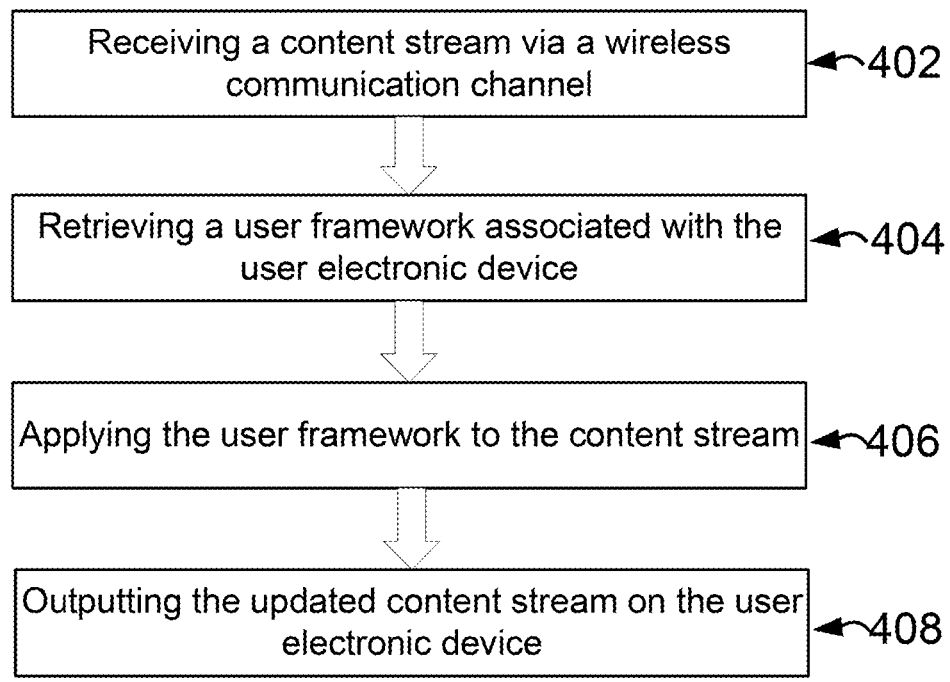
FIG. 5 is a flowchart illustrating a method of outputting a content stream on a user electronic device according to an embodiment of this disclosure.

FIG. 5 shows a method of outputting a content stream on a user electronic device according to an embodiment of this disclosure. Thus, FIG. 5 is from the user perspective, rather than the sender perspective.

At step 402, the method comprises receiving a content stream from a sender via a wireless communication channel, wherein the content stream comprises a plurality of tracks (as discussed above). The content stream may be arranged as defined by a sender framework. The sender framework may not be transmitted to the user electronic device.

The user electronic device then retrieves a user framework associated with the user electronic device (step 404). The user framework defines at least one predetermined setting or instruction to be applied to the received content stream. The user framework may be stored in a memory of the user electronic device, or the user electronic device may retrieve the user framework from an external memory or storage resource in communication with the user electronic device.

Figure 6:
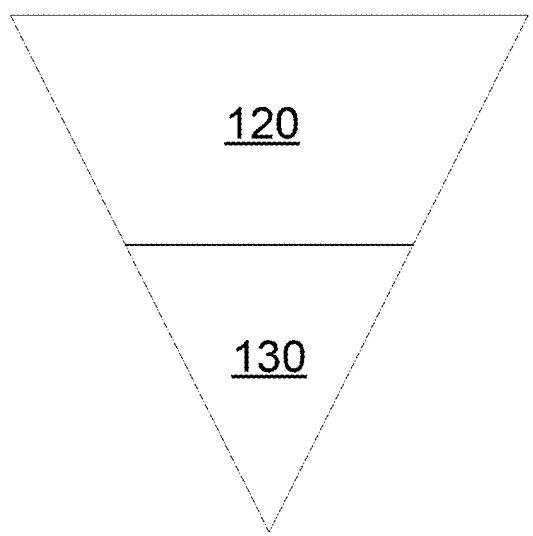
FIG. 6 is a diagram illustrating the hierarchy of a sender framework and a user framework according to an embodiment of this disclosure.

Whilst the sender framework discussed in relation to FIGS. 3 and 4 defines an arrangement of the output content stream that tailors the stream to the content being sent, the user framework is arranged to tailor the content stream to the specific user device and any preferences of the user. The frameworks may be considered to be hierarchical, as illustrated in FIG. 6, wherein the sender framework 120 is at the base of the pyramid and the user framework 130 is at the top of the pyramid. As shown, the user framework 130 takes priority and can override the sender framework 120 if required.

The user framework may define a subset of the plurality of tracks to be output on the user electronic device. In some embodiments, the at least one predetermined setting or instruction defined by the user framework includes a maximum number of video feeds that can be simultaneously displayed on the user electronic device.

In some embodiments, the at least one predetermined setting or instruction defined by the user framework includes a spatial location of one or more of the plurality of tracks to be output on the user electronic device. The user framework may define or adjust a layout of the content stream on the display screen.

For example, a widescreen TV can accommodate a large number of video feeds and GUI elements (but could be limited by processing power if using the TV's CPU rather than a console or PC processing). Conversely if you are viewing on a smartphone screen there is not as much space (and processing power could be low) so there may only be one or two video feeds max and perhaps just one GUI element. The user framework can adjust the content stream according to the technical limitations of the user electronic device.

In some embodiments, the at least one predetermined setting or instruction defined by the user framework includes a visual or audio parameter of one or more of the plurality of tracks to be output on the user electronic device. For example, this may allow the user to predefine settings to support accessibility needs, which may include specific visual or audio impairments or requirements.

At step 406, the method comprises applying the user framework 130 to the content stream. In some embodiments, step 406 comprises retrieving information stored on the user electronic device, or in memory operably coupled to the user electronic device, and including the retrieved information in the content stream. For example, the method may include retrieving stored game asset packs from the user electronic device, or retrieving data defining a map or other stored content associated with the stream. This may reduce the amount of data or information that has to be transmitted by the sender.

The updated content stream is then output on the user electronic device (step 408). This may comprise displaying at least one of the plurality of tracks on a display screen of the user electronic device, and/or rendering at least a portion of one of the tracks (such as a map or GUI element) for display on the display screen of the user electronic device.

Following step 408, the user electronic device may monitor the bandwidth or quality of the wireless communication channel. In response to detecting a change in the bandwidth or quality of the wireless communication channel, the user electronic device may adjust the user framework accordingly.

Adjusting the user framework may comprise adjusting a composition of the content stream to be output on the user electronic device, and/or adjusting an overall number of the plurality of tracks included in the content stream.

In some embodiments, the user framework may be updated to change a resolution of one or more of the plurality of tracks included in the content stream, or to compress one or more of the plurality of tracks included in the content stream.

Following step 408, the user electronic device may receive a user input to adjust the user framework. For example, in response to an event in the content stream, the user may wish to alter the presentation or type of content output. The event may be the termination of a track, or the receipt of a new track. The method may include adjusting the user framework in response to the user input. The user input may be received on the user electronic device itself, or on an input device (such as a controller) in communication with the user electronic device.

Figure 7:
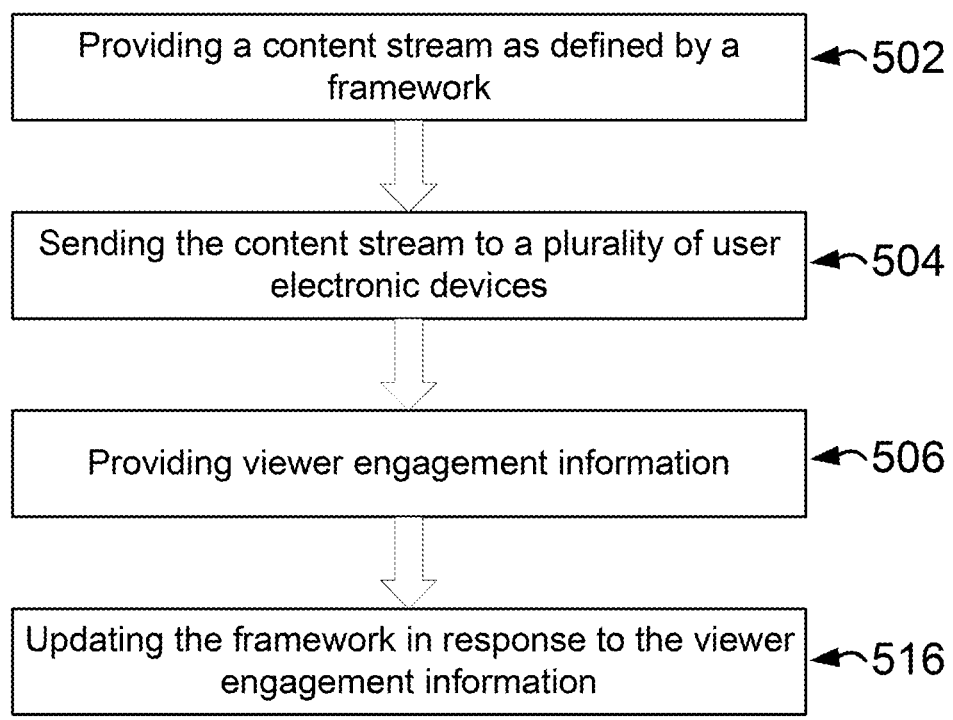
FIG. 7 is a flowchart illustrating a method of updating a framework for a content stream according to an embodiment of this disclosure.

According to another aspect of this disclosure there is provided a method of updating a framework for a content stream following the receipt of viewer engagement information. FIG. 7 is a flowchart illustrating an embodiment of this method.

At step 502 the method comprises providing a content stream as defined by a framework, wherein the content stream comprises a plurality of tracks. The framework may be referred to as a sender framework. The content stream is then sent or output from the sender to a plurality of user electronic devices (step 504). Each of the plurality of user electronic devices are not necessarily the same type of device. As described above, each user electronic device may comprise a plurality of devices in communication with each other (or operably connected), such as at least one display screen, at least one speaker, and a processing device.

At step 506 the method comprises providing viewer engagement information to the sender, or to a third party. The viewer engagement information is received by the user electronic device and is sent to the sender or third party. Thus, there may be a two-way communication channel established between the sender and each user electronic device.

The viewer engagement information may comprise data or information regarding how the content stream is consumed by the user. In some embodiments, the viewer engagement information may comprise information regarding any changes the user (or the user electronic device) has made to the content stream or the framework. In some embodiments, the viewer engagement information may comprise information regarding a user framework applied to the content stream.

In some embodiments, the viewer engagement information comprises an identification of the tracks or data being output on the user device. For example, although the content stream received by the user electronic device is defined according to the sender framework, the user or the user electronic device may remove one or more tracks from the content stream, or add additional data (or tracks) provided by the user electronic device.

In some embodiments, the viewer engagement information comprises information regarding a visual or audio parameter adjusted or defined by the user or the user electronic device. The viewer engagement information may include timing information, such as the time at which the user made the given change to the content stream, and/or a time reference from the content stream corresponding to when the user change was made.

At step 516, the sender updates the framework (or sender framework) in response to the viewer engagement information received. As such, new joiners to the stream (i.e., any additional user electronic devices) will receive the content stream as defined by the updated framework, to help improve the user experience based on the viewer engagement information received. Optionally, when the framework is updated, the sender may also adjust the content stream sent to current viewers (as well as new viewers) as defined by the updated framework.

Additionally, the viewer engagement information can also be sent as feedback to the content source (e.g., streamers or broadcasters), which is not shown in FIG. 7. The viewer engagement information can be averaged or processed for anonymity before sending to the content source. For example, the feedback may rank each of the sources, or tracks within the content stream, in terms of popularity.

Figure 8:
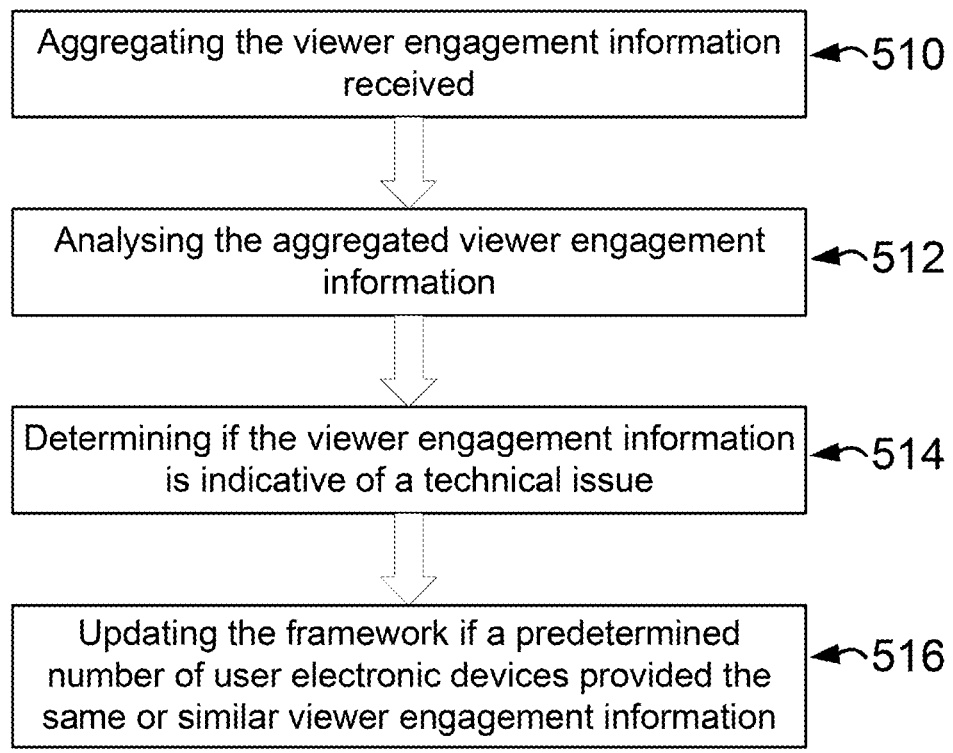
FIG. 8 is a flowchart illustrating additional steps of a method of updating a framework for a content stream according to an embodiment of this disclosure.

FIG. 8 is a flowchart illustrating a method that may follow on from step 506 in FIG. 7. The method in FIG. 8 is from the perspective of the sender or third party responsible for the viewer engagement process.

At step 510 the method comprises aggregating (or collating) the viewer engagement information received from the one or more user electronic devices. At step 512 the method comprises processing and/or analysing the aggregated viewer engagement information. In some embodiments, the analysis at step 512 may determine any correlation between the viewer engagement information received from different users. This may include, for example, determining the number of users that have made the same or similar changes to the content stream.

In some embodiments, the analysis at step 512 may determine whether multiple users made changes to the content stream within a given period of time. For example, the method may identify if there is a particular time in the content stream (within a given tolerance) at which multiple viewers have made changes to the content stream (whether or not these are the same changes).

For example, if step 512 determines that a given proportion of the viewers are adjusting the framework (or the content stream) to focus on a specific video track (e.g. camera 2) as the main view, then this suggests that this content is of more interest to the viewers than predicted by the sender framework.

In some embodiments, the viewer engagement information may comprise information regarding the user electronic device, or the user (viewer) associated with the user electronic device. For example, the user may set up a profile linked to the user electronic device. The viewer engagement information may include one or more properties of the user electronic device, including but not limited to, the type of user electronic device, the size or number of display screens, the processing power of the user electronic device, etc. The viewer engagement information may include one or more properties or preferences of the user (or viewer), including but not limited to, age or age range, gender, nationality, location. In some embodiments the properties or preferences may be more specialised, such as which sports teams the user supports.

The analysis at step 512 may group the viewer engagement information according to the information received regarding the user electronic device, or the user (viewer) associated with the user electronic device. This may allow the sender to tailor the framework according to viewer profiles. For example, a certain age range might prefer a particular layout of the content, or may prefer different content compared to viewers of a different age range. If the content stream includes a football match, then if the sender knows that supporters of a given team prefer the video stream of the camera located at the away end of the stadium, then the framework can be adjusted accordingly.

At step 514, the method comprises determining if the viewer engagement information is indicative of a possible technical issue with the content stream. For example, if the sender identifies that a significant portion of viewers are adjusting the framework (or content stream) to mute or remove the same audio track, then this may be indicative of a problem with the sound quality of this audio track, or a technical issue such as no sound being transmitted in the audio track, or a lag between the audio and a corresponding video track.

In some embodiments, step 514 may comprise reviewing timing information provided in the aggregated viewer engagement information. For example, if the viewers in question all muted or removed the same audio track at the same time in the content stream (e.g. 20 minutes after the start of the content stream) then this may indicate that an event occurred at that time in the content stream that prompted the viewers to make this change. The event may be a technical fault.

Of course, it may be that there is no technical or quality issue, as the viewers may be making the same changes due to user preference. This will also be of interest to the sender and/or content provider. The sender may flag the possible technical issue for review. The sender may output a notification in response to determining that the viewer engagement information is indicative of a possible technical issue. The notification may be output to at least one device in communication with the sender (such as a technical support team). The notification may be output to the source of the content in question (e.g., the streamer), such that the source can verify if there is a technical or quality issue and, preferably, take appropriate action to resolve the issue.

Optionally, the sender may ask the viewer to confirm if the change was made due to a technical or quality issue. In some embodiments, this information may be included in the viewer engagement information received.

It will be appreciated that in some embodiments the method may not include both steps 512 and 514.

At step 516, the method comprises updating the framework (sender framework) if a predetermined number of viewers (or user electronic devices) are found to provide the same or similar viewer engagement information. The predetermined number may be a threshold percentage of viewers that may be set by the sender, or the content source. This may ensure that the framework is only updated to become the new default framework in response to popular viewer feedback.

For example, if the threshold is set to 75% and 90% of viewers either mute, reduce the volume of, or remove, a given track or stream, then at step 516 the framework will be updated in response to this feedback. The framework may be updated to lower the prominence of this track or stream, for example selecting this track or stream as secondary content rather than main content.

It will be appreciated that in step 516 the framework may not be updated at all, if insufficient viewer engagement information has been received, if there is no consensus in the viewer engagement information received, or if the viewer engagement information indicates that no changes are required to the framework.

Accordingly, there has been described a method of sending a content stream, comprising retrieving a sender framework associated with the at least one attribute, wherein the sender framework defines an arrangement of the plurality of tracks to be included in an output content stream. The output content stream is defined according to the sender framework. There has also been described a method of outputting a content stream on a user device, comprising receiving a content stream as defined by a sender framework, retrieving a user framework associated with the user electronic device, wherein the user framework defines at least one predetermined setting or instruction to be applied to the content stream, and applying the user framework to the content stream to update the content stream. The method may also include providing viewer engagement information and updating the sender framework in response to the viewer engagement information received.

Although particular embodiments of this disclosure have been described, it will be appreciated that many modifications, additions and/or substitutions may be made within the scope of the claims.

The invention claimed is:

1. A method of sending a content stream from a sender to at least one user electronic device, the method comprising:
   obtaining, at the sender, an input content stream comprising a plurality of tracks;
   determining, at the sender, at least one attribute of the input content stream, wherein the at least one attribute is determined by the sender without requiring input from a user;

retrieving a framework associated with the at least one attribute, wherein the framework defines an arrangement of the plurality of tracks to be included in an output content stream, wherein the arrangement of the plurality of tracks in the framework is determined by the sender based on the at least one attribute, the arrangement being customized for a user electronic device;

preparing the output content stream as defined in the framework;

sending the output content stream to the user electronic device via a wireless communication channel;

aggregating viewer engagement information that has been received from a plurality of user electronic devices and analyzing the aggregated viewer engagement information; and in response to determining that a number of the plurality of user electronic devices that exceeds a predetermined threshold have provided at least partially same viewer engagement information, dynamically updating the framework during a transmission of the output content stream based on the viewer engagement information.

2. The method of claim 1, wherein the plurality of tracks comprises at least one video track; and/or at least one audio track; and/or at least one data track, wherein the at least one data track comprises one or more of: game play information; user interface information; at least one GUI element; player information; environmental information; and/or metadata.

3. The method of claim 1, wherein the at least one attribute comprises one or more of:
stream type;
content type;
content genre; and/or
a number of tracks contained in the plurality of tracks.

4. The method of claim 1, wherein determining at least one attribute of the input content stream comprises detecting an event in at least one of the plurality of tracks.

5. The method of claim 1, wherein preparing the output content stream as defined in the framework comprises at least one of:
selecting a subset of the plurality of tracks for inclusion in the output content stream;
processing or filtering the plurality of tracks;
defining a relative weighting of each of the plurality of tracks to be included in the output content stream;
adjusting at least one property of one or more of the plurality of tracks to be included in the output content stream; and
providing display instructions defining how the plurality of tracks to be included in the output content stream should be displayed on the user electronic device.

6. The method of claim 1, further comprising:
determining a property of one or more of the plurality of tracks indicative of quality or technical performance; and
comparing the property to a predetermined threshold,
wherein in response to determining that the property is below the predetermined threshold, the method further comprises removing a track of the plurality of tracks from the output content stream.

7. The method of claim 1, further comprising:
determining at least one property of the user electronic device and/or of the wireless communication channel; and
updating the framework or the output content stream accordingly.

8. The method of claim 7, wherein determining at least one property of the user electronic device and/or of the wireless communication channel comprises determining one or more of:
a type of the user electronic device, where the type of user electronic device is selected from: a PC; a laptop; a tablet computer; a mobile phone; a smart TV; a gaming console; or other computing device;
an estimated bandwidth of the wireless communication channel;
a measure of quality or speed of the wireless communication channel;
an estimated maximum processing power of the user electronic device; and
an estimated maximum number of video feeds that can be simultaneously displayed on the user electronic device.

9. The method of claim 8, wherein updating the framework or the content stream comprises one or more of:
adjusting a composition of the output content stream;
adjusting an overall number of the plurality of tracks included in the output content stream;
adjusting a resolution of one or more of the plurality of tracks included in the output content stream; and
compressing one or more of the plurality of tracks included in the output content stream.

10. The method of claim 1, further comprising:
monitoring the plurality of tracks received at the sender; and
in response to detecting that a given track is no longer being received at the sender, updating the framework.

11. The method of claim 10, further comprising:
in response to detecting that a predetermined number of the plurality of tracks are no longer being received at the sender, or in response to detecting that a predetermined condition has been satisfied, retrieving a second framework; and
arranging the output content stream as defined in the second framework, optionally wherein the second framework is a default framework, or a menu framework.

12. The method of claim 1, wherein preparing the output content stream as defined in the framework comprises defining a relative weighting of each of the plurality of tracks to be included in the output content stream.

13. A method of updating a framework for a content stream, the content stream comprising a plurality of tracks, the method comprising:
providing a content stream as defined by a framework, wherein the framework defines at least one setting or property of the content stream, wherein the at least one setting or property is determined by a sender without requiring input from a user;
sending the content stream as defined by the framework from the sender to a plurality of user electronic devices;
providing viewer engagement information from at least one of the plurality of user electronic devices to the sender, wherein said viewer engagement information comprises data defining how the content stream is being output at a user device;
aggregating viewer engagement information that has been received from a plurality of user electronic devices and analyzing the aggregated viewer engagement information; and
in response to determining that a number of the plurality of user electronic devices that exceeds a predetermined threshold have provided at least partially same viewer engagement information, dynamically updating the framework during a transmission of the output content stream based on the viewer engagement information, updating the framework in response to the viewer engagement information received.

14. The method of claim 13, wherein the viewer engagement information comprises one or more of:
an identification of the plurality of tracks or data being output on the user device;
an indication of any user changes made to the framework; and
a visual or audio parameter adjusted or defined by the user.

15. The method of claim 14, further comprising:
determining if the aggregated viewer engagement information is indicative of a possible technical issue with a given track in the content stream.

16. The method of claim 15, further comprising outputting a notification in response to determining that the aggregated viewer engagement information is indicative of a possible technical issue.

* * * * *